United States Patent [19]

Nishi et al.

[11] Patent Number: 5,191,026
[45] Date of Patent: Mar. 2, 1993

[54] RING-OPENING HYDROGENATED COPOLYMER AND PROCESS FOR PRODUCING THE SAME

[75] Inventors: Yoshikatsu Nishi, Yokohama; Masayoshi Oshima, Niiza; Teiji Kohara, Kawasaki; Tadao Natsuume, Yokosuka, all of Japan

[73] Assignee: Nippon Zeon Co., Ltd., Tokyo, Japan

[21] Appl. No.: 476,492

[22] PCT Filed: Dec. 24, 1988

[86] PCT No.: PCT/JP88/01327
§ 371 Date: Jun. 7, 1990
§ 102(e) Date: Jun. 7, 1990

[87] PCT Pub. No.: WO89/06253
PCT Pub. Date: Jul. 13, 1989

[30] Foreign Application Priority Data
Dec. 25, 1987 [JP] Japan .................. 62-326688
Dec. 25, 1987 [JP] Japan .................. 62-326689

[51] Int. Cl.⁵ .................. F08F 8/00; C08F 4/64; C08F 232/00; C08G 61/08
[52] U.S. Cl. .................. 525/332.1; 526/90; 526/281
[58] Field of Search .................. 525/326.1, 332.1

[56] References Cited

U.S. PATENT DOCUMENTS 4,080,491 3/1978 Kobayashi et al. .................. 526/137

FOREIGN PATENT DOCUMENTS 0181640 5/1986 European Pat. Off. .
0303246 2/1989 European Pat. Off. .
0317262 5/1989 European Pat. Off. .
46-14910 4/1971 Japan .
58-43412 9/1983 Japan .
6026024 2/1985 Japan .

OTHER PUBLICATIONS

WPIL, File Supplier, Accession No. 89-072686, Derwent Publications, Ltd., London, GB for JP-A-1024 826 (Mitsubishi Chem.) of Jan. 26, 1989.

Primary Examiner—Joseph L. Schofer
Assistant Examiner—Wu C. Cheng
Attorney, Agent, or Firm—Armstrong, Westerman, Hattori, McLeland & Naughton

[57] ABSTRACT

There are disclosed a polycyclic norbornene or its derivative ring-opening hydrogenated copolymer which contains 90–10% by mole of a repeating unit represented by the following formula [I] or the alkly-substituted derivative, at least a repeating unit represented by the following formula [II] or the alkly-substituted derivative thereof and, as required, a repeating unit represented by the following formula [III], the alkyl-substituted derivative thereof or the alkylidene-substituted derivative thereof, has an intrinsic viscosity $[\eta]$ of 0.01–20 dl/g as determined in toluene at 25° C., and in which at least 50% of the (C—C) linkages constituting the main chain are single bonds, and the production of said hydrogenation product

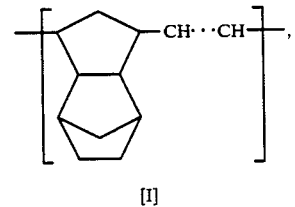

[I]

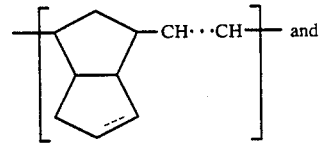

and

[II]

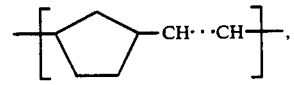

[III]

wherein ⸺ represents either a single bond or a double bond.

35 Claims, No Drawings

RING-OPENING HYDROGENATED COPOLYMER AND PROCESS FOR PRODUCING THE SAME

TECHNICAL FIELD

The present invention relates to a novel ring-opening hydrogenated copolymer excellent in thermal resistance, optical property and moldability. In more particular, it relates to a polycyclic norbornene or its derivative ring-opening hydrogenated copolymer and a process for producing the same.

BACKGROUND ART

Polymers hitherto mainly used as optical materials are polymethyl methacrylate and polycarbonate. However, the former has a problem of rather high water absorption and the latter has a problem of development of birefringence in injection molding. Accordingly, it is becoming difficult for these polymers to meet recent requirements, which are becoming increasingly more severe.

In recent years, polymers which use polycyclic norbornene or allied monomers have been developed as polymeric materials improved in said properties in question. For example, Japanese Patent Application Kokai (Laid-Open) No. 60-26024 describes that the hydrogenated products of ring-opening polymers of tetracyclododecenes or of ring-opening copolymers of tetracyclododecenes and norbornenes are excellent in transparency, water resistance and thermal resistance.

However, the hydrogenated products of ring-opening polymers of tetracyclododecenes are not fully satisfactory in moldability and their birefringence values are not so small as can meet the property requirement sufficiently. The hydrogenated products of ring-opening copolymers of tetracyclododecenes and norbornenes also have similar problems. Although hydrogenated products of this kind having a high proportion of norbornenes in copolymerization of 40-50% by mole are somewhat improved in said properties, they have a low glass transition temperature (Tg) of 90°-100° C. and hence their thermal resistance is not fully satisfactory.

Japanese Patent Application Kokoku (Post-Exam. Publn.) No. 58-43412 describes that the hydrogenated product of dicyclopentadiene ring-opening polymer can be easily heat-melt processed to give a tough, transparent sheet. The hydrogenated product, however, is unsatisfactory in thermal resistance for use as optical disks because it has a low glass transition temperature (Tg) of about 95° C.

On the other hand, polymers or copolymers obtained by using polycyclic norbornene or allied monomers, when they have not been hydrogenated, are poor in resistance to oxidative degradation and hence unsuitable for use as optical materials.

DISCLOSURE OF THE INVENTION

An object of the present invention is to provide a novel polymeric material which is excellent in thermal resistance, optical property and moldability.

Another object of the present invention is to provide a polycyclic norbornene ring-opening hydrogenated copolymer which has a high glass transition temperature and can give moldings with little of optical strain.

The present inventors have made extensive study to develop a novel synthetic resin suitable as optical polymer or as the raw material thereof by using polycyclic norbornene or allied monomers. As the result it has been found out that the hydrogenation products of ring-opening copolymers obtainable by ring-opening copolymerization of tetracyclododecenes with dicyclopentadienes and, as required, norbornenes are excellent in thermal properties and moldability and give moldings with little of optical strain. The present invention has been accomplished on the basis of above finding.

Thus, it has been found out that a polycyclic norbornene or its derivative ring-opening hydrogenated copolymer can attain the above-mentioned objects which comprises 90–10% by mole of a repeating unit represented by the following formula [I] or the alkyl-substituted derivative thereof, at least a repeating unit represented by the following formula [II] or the alkyl-substituted derivative thereof and, as desired, at least one repeating unit selected from a repeating unit represented by the following formula [III], the alkyl-substituted derivative thereof or the alkylidenesubstituted derivative thereof, has an intrinsic viscosity [$\eta$] of 0.01–20 dl/g as determined in toluene at 25° C. and in which at least 50% of the (C⎯C) linkages constituting the main chain are single bonds.

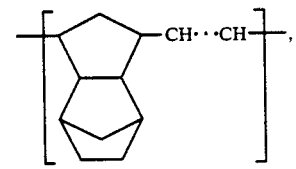

[I]

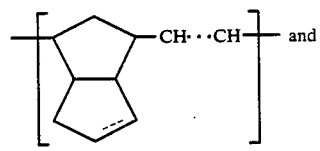

[II] and

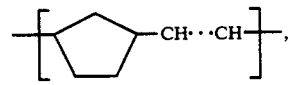

[III]

wherein ⎯ represents either a single bond or a double bond.

BEST MODE FOR CARRYING OUT THE INVENTION

The essential features of the present invention are (1) A polycyclic norbornene or its derivative ring-opening hydrogenated copolymer which contains 90–10% by mole of a repeating unit represented by the following formula [I] or the alkyl-substituted derivative thereof and at least a repeating unit represented by the following formula [II] or the alkyl-substituted derivative thereof, has an intrinsic viscosity [$\eta$] of 0.01–20 dl/g as determined in toluene at 25° C. and in which at least 50% of the C⎯C linkages constituting the main chain are single bonds

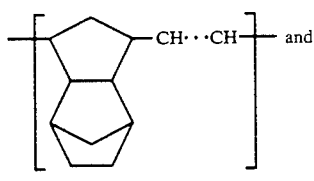

[I]

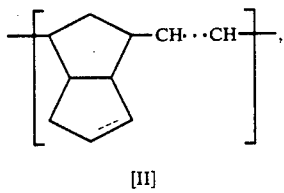

[II]

wherein represents either a single bond or a double bond, and (2) a process for producing a polycyclic norbornene or its derivative ring-opening hydrogenated copolymer wherein at least 50% of the C—C linkages constituting the main chain are single bonds, which comprises hydrogenating with hydrogen and by use of a hydrogenation catalyst a part or the whole of the olefinic unsaturated groups contained in a polycyclic norbornene or its derivative ring-opening copolymer which contains 90–10% by mole of a repeating unit represented by the following formula [I'] or the alkyl-substituted derivative thereof and at least a repeating unit represented by the following formula [II'] or the alkyl-substituted derivative thereof, and has an intrinsic viscosity [η] of 0.01–20 dl/g as determined in toluene at 25° C.

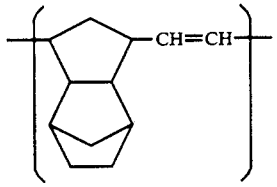

[I']

and

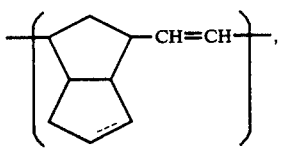

[II']

wherein represents either a single bond or a double bond.

In more particular, the essential features of the present invention are (a) a polycyclic norbornene or its derivative ring-opening hydrogenated copolymer according to (1) above which comprises 10–90% by mole of a repeating unit represented by the formula [II] or the alkyl-substituted derivative thereof, or (b) a polycyclic norbornene or its derivative ring-opening hydrogenated copolymer according to (1) above which contains 5–80% by mole of a repeating unit represented by the formula [II] or the alkyl-substituted derivative thereof and 5–50% by mole of a repeating unit represented by the following formula [III], the alkyl-substituted derivative thereof or the alkylidenesubstituted derivative thereof

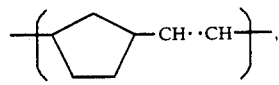

[III]

wherein represents either a single bond or a double bond, and (c) a process for producing a polycyclic norbornene or its derivative ring-opening hydrogenated copolymer according to (2) above, wherein said ring-opening copolymer contains 10–90% by mole of a repeating unit represented by the formula [II'] or the alkyl-substituted derivative thereof, or (d) a process for producing a polycyclic norbornene or its derivative ring-opening hydrogenated copolymer according to (2) above, wherein said ring-opening copolymer contains 5–80% by mole of a repeating unit represented by the formula [II'] or the alkyl-substituted derivative thereof and 5–50% by mole of a repeating unit represented by the following formula [III'], the alkyl-substituted derivative thereof or the alkylidenesubstituted derivative thereof

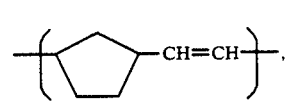

[III']

wherein represents either a single bond or a double bond.

The ring-opening polymer used in the present invention employs as the essential component monomers (A) tetracyclododecenes, namely tetracyclododecene and the alkyl-substituted derivatives thereof (hereinafter sometimes referred to as "component A"), (B) dicyclopentadienes, namely dicyclopentadiene and the alkyl-substituted derivatives thereof, and/or dihydrodicyclopentadienes, namely 2,3-dihydrodicyclopentadiene and the alkyl-substituted derivatives thereof (hereinafter sometimes referred to as "component B") and (C) unsubstituted or substituted norbornene (hereinafter sometimes referred to as "component C"), and can be prepared by known methods of ring-opening polymerization of cyclic olefins. The hydrogenated products of these ring-opening copolymers can be produced by using conventional methods of hydrogenation.

The respective constituents of the present invention will be described in detail below.

Monomer

The components A used in the present invention are tetracyclododecene (hereinafter sometimes abbreviated as "TCD") represented by the following formula [IV] and the alkyl-substituted derivatives thereof.

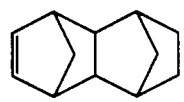

[IV]

Said TCDs may be obtained by subjecting cyclopentadiene to a Diels-Alder reaction with norbornenes, followed by separation from the reaction mixture by such means as distillation.

The TCDs may also be the derivatives of TCD substituted with a lower alkyl group such as methyl, ethyl and propyl. Said alkyl substituent may be present also in plurality.

The components B used in the present invention are dicyclopentadiene (hereinafter sometimes abbreviated as "DCP"), 2,3-dihydrodicyclopentadiene (4,7-methano2,3,3a,4,7,7a-hexahydroindene, hereinafter sometimes abbreviated as "HDCP"), and the derivatives thereof substituted with an alkyl such as methyl, ethyl, propyl and butyl.

The components C used in the present invention are unsubstituted or substituted norbornene (hereinafter sometimes abbreviated as "NB"). Examples of substituted norbornenes include alkyl-substituted norbornenes such as 5-methyl-2-norbornene, 5,6-dimethyl-2-norbornene, 5-ethyl-2-norbornene, 5-butyl-2-norbornene, etc., and alkylidene-substituted norbornenes such as ethylidenenorbornene, etc.

These monomer components may be used each alone or as suitable mixtures thereof.

When the component A and component B are used as the principal components in the present invention, the component A is used in a proportion of 90–10% by mole, preferably 80–20% by mole, more preferably 70–30% by mole, and the component B in a proportion of 10–90% by mole, preferably 20–80% by mole, more preferably 30–70% by mole. When the components A, B and C are used as the principal components, the component A is used in a proportion of 90–10% by mole, preferably 80–20% by mole, the component B in a proportion of 5–80% by mole, preferably 10–70% by mole, and the component C in a proportion of 5–50% by mole, preferably 10–40% by mole. As the proportion of the component A used increases, the glass transition temperature rises. Too high a glass transition temperature is undesirable because it makes processing of the resin difficult and also leads to the increase of birefringence a key optical characteristic.

When the components A, B and C are used as the principal components, the use of the component B in the proportion specified above makes it possible to obtain a product which can give moldings with little of optical strain even in the region of higher glass transition temperature as compared with the hydrogenation products of ring-opening copolymers formed out of the component A and the component C. When said two components or three components are used, if the proportion of the B component is too large, a sufficiently high glass transition temperature is not obtained and the reduction in birefringence attainable is not so marked considering the unsatisfactory glass transition temperature.

When the three components are used, the higher the proportion of the component C used the better the optical property, but too large a proportion thereof results in decreased glass transition temperature.

In the present invention, besides the components A and B and the component C used as required described above, other cycloolefins capable of ring-opening polymerization may be used within the range not substantially deleterious to the effect of the present invention. Specific examples of cycloolefins which may be used are compounds having one reactive double bond, such as cyclopentene, cyclooctene, 5,6-dihydrodicyclopentadiene, etc.

Polycyclic norbornene and allied monomers contain as impurities compounds having two or more reactive double bonds. Such compounds are preferably removed as completely as possible since they are apt to cause gellation of the polymer.

The monomer mixture used in the present invention may be prepared by mixing the component A and the component B, or the component A, the component B and the component C, respectively prepared in advance. Alternately, it may be synthesized directly by heat-treating the component A and the component B, or the component A, the component B and the component C or heat-treating these two or three components in the presence of cyclopentene.

The heat treatment may be effectuated by heating the component A and the component B, or the component A, the component B and the component C in an atmosphere of inert gas such as nitrogen gas at 120°–250° C., preferably 150°–230° C., for 0.5–20 hours, preferably 1–10 hours. The treatment reaction may be conducted either batch-wise or continuously. An inert solvent may also be present in the reaction system.

Further, besides the components A and B or the components A, B and C, chain monoolefins and chain non-conjugated diolefins, such as butene-1, pentene-1, hexene-1, octene-1, butene-2, pentene-2, 1,4-hexadiene, etc., may be added in the polymerization within the range of up to about 10% by mole for molecular weight control.

Polymerization catalyst

The ring-opening copolymers of these monomers are prepared by conventional methods used for polymerization of norbornenes. As polymerization catalysts usable herein, there may be mentioned, for example, compounds of platinum-group metals such as ruthenium, rhodium, palladium, osmium, iridium, and platinum (for example, Japanese Patent Application Kokoku No. 46-4910) or systems comprising compounds of transition metals, such as titanium, vanadium, molybdenum and tungsten, and organometallic compounds of metals of the groups I-IV of the periodic table. Said catalytic systems may be used also in combination with a third component such as tertiary amines, etc. (for example, Japanese Patent Application Kokoku Nos. 41-20111, 57-17883 and 57-61044 and Japanese Patent Application Kokai Nos. 54-86600 and 58-127728).

The polymerization catalyst is not particularly restricted so long as it is a metallic compound capable of effecting ring-opening polymerization of the monomers mentioned above. Preferred are, however, catalytic systems comprising transition metal compounds such as titanium tetrahalides and organometals such as organo-aluminum compounds, or catalytic systems comprising said systems and a third component such as aliphatic or aromatic tertiary amines incorporated thereinto.

Specific examples of the polymerization catalyst will be described below.

Transition metal compound

Preferred metal compounds are those of transition metals such as titanium, vanadium, tungsten and molybdenum. More specifically, there may be cited the halides, oxyhalides, oxides, carbonyl compounds and organic ammonium salts of these transition metals.

As specific examples, there may be mentioned $TiCl_4$, $TiBr_4$, $VOCl_3$, $VOBr_3$, $WBr_2$, $WBr_4$, $WBr_6$, $WCl_2$, $WCl_4$, $WCl_5$, $WCl_6$, $WF_4$, $WI_2$, $WI_4$, $WOBr_4$, $WOCl_4$, $WOF_4$, $MoBr_2$, $MoBr_3$, $MoBr_4$, $MoCl_4$, $MoCl_5$, $MoF_4$, MoOCl$_4$, MoOf$_4$, WO$_2$, H$_2$WO$_4$, Na$_2$WO$_4$, (NH$_4$)$_2$WO$_4$, CaWO$_4$, CuWO$_4$, MgWO$_4$, (CO)$_5$W-C(OCH$_3$), (CO)$_5$WC(OC$_5$H$_5$)(C$_2$H$_5$), (CO$_5$MoC-(OC$_2$H$_5$) (CH$_3$), (CO)$_5$Mo=C(OC$_2$H$_5$)(N(C$_2$H$_5$)$_2$), tridecylammonium molybdate, tridecylammonium tungstate, etc.

Organometallic compound

Organometallic compound which may be used include those of the metals of the groups I-IV of the periodic table, for example, organoaluminum compounds, organo tin compounds, or compounds of lithium, sodium, magnesium, zinc, cadmium, boron, etc.

Specific examples of the organoaluminum compound include trimethylaluminum, trimethylaluminum, tri-n-proppylaluminum, triisopropylaluminum, triisobutylaluminum, trihexylaluminum, trioctylaluminum, triphenylaluminum, tribenzylaluminum, diethylaluminum monochloride, di-n-propylaluminum monochloride, diisobutylaluminum monochloride, di-n-butylaluminum monochloride, diethylaluminum monobromide, diethylaluminum monoiodide, diethylmuminum monohydride, di-n-propylalumimum monohydride diisobutylamluminum monohydride, methylaluminum sesquichloride, ethylaluminum sesquibromide, isobutylaluminum sesquichloride, ethylaluminum dichloride, ethylaluminum dibromide, isobutylaluminum dichloride, ethylaluminum dibromide, and ethylaluminum diiodide.

Specific examples of the organotin compound include tetramethyltin, diethyldimethyltin, tetraethyltin, dibutyldiethyltin, tetrabutyltin, tetraisocumyltin, tetraphenyltin, triethyltin fluoride, triethyltin chloride, triethyltin bromide, triethyltin iodide, diethyltin difluoride, diethyltin dichloride, diethyltin bromide, diethyltin diiodide, ethyltin trifluoride, ethyltin trichloride, ethyltin tribromide, and ethyltin triiodide. As other examples, mention may be made of n-butyllithium, n-pentylsodium, methylmagnesium iodide, ethylmagnesium bromide, methylmagnesium bromide, n-propylmagnesium chloride, t-butylmagnesium chloride, allylmagnesium chloride, diethylzinc, diethylcadmium, trimethylboron, triethylboron, and tri-n-butylboron.

Third component

A third component may be added to the catalytic system mentioned above to enhance the polymerization activity and improve the selectivity in ring-opening polymerization. As specific examples, there may be cited molecular oxygen, alcohols, ethers, peroxides, carboxylic acids, acid anhydrides, acid chlorides, esters, ketones, nitrogen-containing compounds, sulfur-containing compounds, halogen-containing compounds, molecular iodine, and further Lewis acids, etc. Preferred among them are aliphatic or aromatic tertiary amines, specific examples of which include triethylamine, dimethylaniline, tri-n-butylamine, pyridine and α-picoline.

Solvent

The polymerization of the ring-opening copolymer used in the present invention may be carried out without using a solvent, but it can be conducted also in an inert organic solvent.

Specific examples of the solvent include aromatic hydrocarbons such as benzene, toluene and xylene, aliphatic hydrocarbons such as n-pentane, hexane and heptane, alicyclic hydrocarbons such as cyclohexane, halogenated hydrocarbons such as methylene dichloride, dichloroethane, dichloroethylene, tetrachloroethane, chlorobenzene, dichlorobenzene, and trichlorobenzene, etc. These solvents may be used also as a mixture of two or more thereof.

Polymerization temperature

Though the temperature of the ring-opening copolymerization is not critical, it is usually selected as desired from the range of $-20°$ C. to 100° C.

Polymerization pressure

The polymerization pressure is preferably selected usually from the range of 0–50 kg/cm$^2$.

Hydrogenation

The ring-opening hydrogenated copolymer of the present invention can be obtained by hydrogenating the ring-opening copolymer mentioned above to saturate a part or the whole of its olefinic unsaturated groups (i.e., the double bonds of the main chain and the double bonds of the unsaturated ring), whereby the resistance to thermal degradation and the resistance to photo-degradation of the polymer can be improved further. The hydrogenation rate ranges theoretically from 0 to 100%, the case wherein all of the double bonds of the ring-opening polymer have been saturated by hydrogenation being taken as 100%, and can actually be selected as desired within said range. To enhance the resistance to thermal degradation and the resistance to photo-degradation, however, at least 50% of the main chain double bonds should be hydrogenated.

The hydrogenation of the ring-opening copolymer is conducted by conventional methods. The hydrogenation catalysts which can be used may be those generally used in hydrogenation of olefinic compounds and are not particularly restricted. Examples thereof are as follows. As examples of heterogeneous catalysts, there may be mentioned such metals as nickel, palladium and platinum or solid catalysts comprising said metals supported on a carrier such as carbon, silica, diatomaceous earth, alumina and titanium oxide, e.g. nickel/silica, nickel/diatomaceous earth, palladium/carbon, palladium/silica, palladium/diatomaceous earth, and palladium/alumina. As examples of homogeneous catalysts, there may be mentioned those based on metals of the group VIII of the periodic table, for example, those comprising a Ni or Co compound and an organometallic compound of metals of the groups I-III of the periodic table, such as nickel naphthenate/triethylaluminum, cobalt octenoate/n-butyllithium, and nickel acetylacetonate/triethylaluminum, or Rh compounds.

The hydrogenation is conducted either in a homogeneous system or in a heterogeneous system according to the kind of catalyst. Though the conditions for hydrogenation may vary depending on the kind of catalyst, it is usually conducted under a hydrogen pressure of 1–150 atm at 0°–250° C., preferably at 20°–180° C. Although the rate of hydrogenation may be controlled as desired by varying the hydrogen pressure, reaction temperature, reaction time, catalyst temperature etc., it is necessary for obtaining hydrogenation products excellent in resistance to thermal degradation and resistance to photo-degradation to hydrogenate at least 50%, preferably at least 80%, more preferably at least 90% of the main chain double bonds in the polymer. (Ring-opening hydrogenated copolymer)

The ring-opening copolymer used in the present invention has an intrinsic viscosity $[\eta]$ determined in toluene at 25° C. of 0.01-20 dl/g, preferably 0.1-10 dl/g. Similarly, the ring-opening hydrogenated copolymer of the present invention has a $[\eta]$ of 0.01-20 dl/g, preferably 0.1-10 dl/g. Hydrogenated products having a $[\eta]$ in said range have good thermal resistance, water resistance, transparency, chemical resistance, solvent resistance, processability and mechanical properties.

Ring-opening hydrogenated polymers formed out of TCDs alone or with an excessively large proportion of TCDs in copolymerization have a high glass transition temperature and excellent thermal resistance but, on the other hand, have a problem of poor processability. Hydrogenation products of ring-opening copolymers of TCDs and NBs give a high birefringence value and apt to give rise to optical strain in moldings. As contrasted thereto, in the ring-opening hydrogenated copolymer of the present invention, the glass transition temperature of the polymer can be controlled appropriately to obtain a good balance between thermal resistance and processability by copolymerizing in specified ratios the component A (TCDs) with the component B (DCPs, HDCPs), or the components A and B with the component C (NBs). More specifically, the hydrogenation products of the present invention have a glass transition temperature (Tg) controllable as desired in the range of about 100° C.-150° C. when the polymers are formed out of two components of A and B and about 100° C.-about 135° C. when they are formed out of the components A, B and C, and resultantly show a good moldability. Further, as is apparent from the value of birefringence moldings with little of optical strain can be obtained even in the region of high Tgs.

Moreover, the hydrogenation products exhibit excellent balance among light transmission, water resistance, chemical resistance, solvent resistance, and mechanical strength. Accordingly, they are suitable particularly as optical materials.

Further, the ring-opening hydrogenated polymers of the present invention have a still more improved resistance to thermal degradation and resistance to photo-degradation as compared with the ring-opening copolymers used therefor.

Processing

The ring-opening hydrogenated copolymer of the present invention can be processed by known methods. Various additives may be added thereto in processing, including in organic and organic fillers, stabilizers, antistatic agents, lubricants, etc.

Uses

The ring-opening hydrogenated copolymer of the present invention has a high glass transition temperature and, as is apparent from the fact that the unsaturated groups in the original copolymer have been hydrogenated, are excellent in resistance to thermal degradation and photo-degradation and in optical properties and well-balanced among transparency, water resistance, chemical resistance and mechanical properties, so that it is useful in a wide field as various formed articles.

Thus, it can be used in a variety of fields including, for example, optical field, e.g. for optical lenses, optical disks, optical fibers, pellicles and glass windows; electric field, e.g. for water tanks of electric irons, electronic oven parts, substrates for liquid crystal display, printed boards, circuit boards for high frequency waves, and transparent electroconductive sheets and film; medical and related fields, e.g., for injectors, pipets and animal cages; and further for camera bodies, housings of various measuring instruments, films, sheets and helmets.

EXAMPLE

The present invention will be described in more detail below with reference to Examples and Comparative Examples, but it is in no way limited to these Examples. In the following description, "part" means "part by weight" unless otherwise specified.

EXAMPLE 1

In a reactor thoroughly dried and purged with nitrogen were placed 50 parts of tetracyclododecene (TCD), 50 parts of dicyclopentadiene (DCP), 1% by mole of 1-hexene based on the total amount of monomers, and 300 parts of toluene. Then 16 parts of a 1 molar concentration toluene solution of triethylaluminum, 4 parts of triethylamine and 3 parts of 1 molar concentration toluene solution of titanium tetrachloride were added thereto and the resulting mixture was allowed to react at 25° C. for 2 hours.

The reaction solution was poured into an acetone/isopropyl alcohol mixture (volume ratio: 1/1; the same applies hereinafter) to coagulate the polymer, and then the precipitate was separated by filtration and dried to obtain 74 parts of a polymer. Yield: 74%.

Analysis of the polymer obtained above by proton NMR spectrometry gave a molar ratio of the TCD component to the DCP component in the polymer of 45:55. The intrinsic viscosity determined in toluene at 25° C. was 0.62 dl/g.

Separately, 50 parts of the above polymer was dissolved in 500 parts of cyclohexane and subjected to hydrogenation using 5 parts of palladium-carbon catalyst at a hydrogen pressure of 60 kg/cm$^2$ and a temperature of 140° C. for 4 hours. The polymer solution thus obtained was filtered to remove the catalyst, then poured into an acetone/isopropyl alcohol (1/1) mixture to effect coagulation, and the precipitate was collected by filtration and dried to obtain 43 parts of a polymer.

Analysis of the polymer by proton NMR spectrometry showed that the absorption of proton due to double bond had disappeared. Thus it was confirmed that the polymer had been hydrogenated nearly completely (namely, hydrogenation rate: 100%).

The intrinsic viscosity of the hydrogenated polymer was 0.60 dl/g as determined in toluene at 25° C. The glass transition temperature of the polymer determined by DSC analysis was 127° C.

The hydrogenated polymer was injection-molded at 350° C. and at an injection pressure of 2000 kg/cm$^2$ to prepare optical disk plates 13 cm in diameter and 1.2 mm in thickness, which were then subjected to determination of light transmittance (measured at 830 nm), birefringence value (double pass, measured at 633 nm) and moisture absorption (rate of weight change after immersion at 25° C. for 24 hours). It was found that the light transmittance was 91%, the birefringence value (inner periphery-outer periphery of the optical disk plate) was 20-60 nm, and the moisture absorption was 0.1% or less.

The solvent resistance was evaluated by immersing the optical disk plate in ethyl acetate or acetone at room temperature for 20 hours and observing any change in appearance. The chemical resistance was evaluated by immersing the plate in 97.6% sulfuric acid and 28% aqueous ammonia solution at room temperature for 20 hours and observing any change in appearance. Resultantly, no change in appearance was observed in any of the tests.

The above results reveal that the ring-opening hydrogenated copolymer of the present invention is excellent in thermal resistance and optical properties and further is satisfactory in other properties including water resistance and solvent resistance.

EXAMPLE 2–5

Ring-opening copolymerization, hydrogenation and injection molding were conducted in the same manner as in Example 1 except that the monomer composition was altered to the compositions shown in Table 1.

The polymers and the optical disk plates thus obtained were subjected to determination of properties in the same manner as in Example 1. The properties thus determined are shown in Table 1.

COMPARATIVE EXAMPLES 1–3

For comparison, polymers and optical disk plates were prepared and their properties were determined in the same manner as in Example 1 except for using as the monomer(s) TCD alone, DCP alone, or TCD and norbornene (NB). The results are shown in Table 1.

monomers and 300 parts of toluene. Then 16 parts of 1 molar concentration of toluene solution of triethylaluminum, 4 parts of triethylamine and 3 parts of 1 molar concentration toluene solution of titanium tetrachloride were added thereto and the resulting mixture was allowed to react at 25° C. for 2 hours.

The reaction solution was poured into an acetone/isopropyl alcohol (1/1) mixture to coagulate the polymer, and the precipitate was collected by filtration and dried to obtain 72 parts of a ring-opening copolymer (polymer).

The composing ratios (% by mole) of the units originating from the respective components of TCD, NB and DCP in the polymer obtained above were calculated based on the result of proton NMR spectrometric analysis and the gas chromatographic analysis of the amount of residual monomers after polymerization. The ratios thus found were 49% by mole for the TCD component, 13% by mole for the NB component and 38% by mole for the DCP component.

Separately, 50 parts of the above polymer was dissolved in 500 parts of cyclohexane and subjected to hydrogenation using 5 parts of palladium-carbon catalyst at a hydrogen pressure of 60 kg/cm$^2$ and a temperature of 140° C. for 4 hours. The polymer solution thus obtained was filtered to remove the catalyst, then poured into an acetone/isopropyl alcohol (1/1) mixture

TABLE 1

|  | Example | | | | Comparative Example | | |
| --- | --- | --- | --- | --- | --- | --- | --- |
|  | 2 | 3 | 4 | 5 | 1 | 2 | 3 |
| DCP (wt %) | 75 | 60 | 40 | 20 | 0 | 0 | 100 |
| TCD (wt %) | 25 | 40 | 60 | 80 | 100 | 85 | 0 |
| NB (wt %) | 0 | 0 | 0 | 0 | 0 | 15 | 0 |
| Yield (wt %) | 75 | 78 | 76 | 76 | 60 | 65 | 68 |
| DCP repeating unit content in polymer (mol %) | 79 | 65 | 45 | 23 | 0 | 0 | 100 |
| TCD repeating unit content in polymer (mol %) | 21 | 35 | 55 | 77 | 100 | 77 | 0 |
| NB repeating unit content in polymer (mol %) | 0 | 0 | 0 | 0 | 0 | 23 | 0 |
| Hydrogenation rate (%) | 100 | 100 | 100 | 100 | 100 | 100 | 100 |
| Glass transition temperature Tg (°C.) | 110 | 120 | 133 | 150 | 163 | 125 | 93 |
| Intrinsic viscosity [η] (dl/g) | 0.59 | 0.60 | 0.60 | 0.63 | 0.59 | 0.63 | 0.68 |
| Light transmittance (%) (1.2 mm thick disk, determined at 830 mm) | 92 | 91 | 90 | 91 | 89 | 91 | 91 |
| birefringence (nm) (double pulse, determined at 633 nm) | 15~60 | 20~60 | 20~70 | 30~80 | 40~130 | 30~80 | 30~90 |
| Moisture absorption (wt %) (JIS 6911) | 0.1> | 0.1> | 0.1> | 0.1> | 0.1> | 0.1> | 0.1> |
| Solvent resistance (20 hours, room temp.) | | | | | | | |
| Ethyl acetate | ○ | ○ | ○ | ○ | ○ | ○ | ○ |
| Acetone | ○ | ○ | ○ | ○ | ○ | ○ | ○ |
| Chemical resistance (20 hours, room temp.) | | | | | | | |
| 28% aq. ammonia | ○ | ○ | ○ | ○ | ○ | ○ | ○ |
| 97.6% sulfuric acid | ○ | ○ | ○ | ○ | ○ | ○ | ○ |

Note:
The symbol ○ in the table indicates that no change occurred in appearance.

As is apparent from Table 1, the ring-opening hydrogenated copolymer of the present invention has a Tg in a favorable range of 110°–150° C., shows a good birefringence value even in the region of relatively high Tg and is excellent in optical properties. Further, it has high water resistance and chemical resistance, and thus is a polymer with well-balanced properties.

EXAMPLE 6

In a reactor thoroughly dried and purged with nitrogen, were placed 55 parts of tetracyclododecene (TCD), 10 parts of norbornene (NB) and 35 parts of dicyclopentadiene (DCP) (100 parts in sum) and then 1% by mole of 1-hexene based on the total amount of to effect coagulation, and the precipitate was collected by filtration and dried to obtain 46 parts of a hydrogenated polymer.

Analysis of the hydrogenated polymer by proton NMR spectrometry showed that the absorption of proton due to double bond had disappeared. Thus, it was confirmed that the polymer had been hydrogenated nearly completely (hydrogenation rate: 100%).

The intrinsic viscosity of the hydrogenated polymer was 0.61 dl/g as determined in toluene at 25° C. The glass transition temperature of the polymer determined by DSC analysis was 120° C.

The hydrogenated polymer was injection-molded at 350° C. and at an injection pressure of 2,000 kg/cm² to prepare optical disk plates 13 cm in diameter and 1.2 mm in thickness, which were then subjected to determination of light transmittance (measured at 830 nm), birefringence value (double pass, measured at 633 nm) and moisture absorption (rate of weight change after immersion at 25° C. for 24 hours). It was found that the light transmittance was 91%, the birefringence value (inner periphery-outer periphery of the optical disk plate) was 10-40 nm and the moisture absorption was 0.1% or less.

The solvent resistance was evaluated by immersing the respective optical disk plate in ethyl acetate or acetone at room temperature for 20 hours and observing any change in appearance. The chemical resistance was evaluated by immersing the plate in 97.6% sulfuric acid or 28% aqueous ammonia solution at room temperature for 20 hours and observing any change in appearance. Resultantly, no change in appearance was observed in any of the tests.

The above results reveal that the ring-opening hydrogenated copolymer of the present invention is excellent in thermal resistance and optical properties and further is satisfactory in other properties including water resistance and solvent resistance.

EXAMPLES 7-10

Ring-opening copolymerization, hydrogenation and injection molding were conducted in the same manner as in Example 6 except that the monomer composition was altered to the compositions shown in Table 2.

The polymers and the optical disk plates thus obtained were subjected to determination of properties in the same manner as in Example 6. The results are shown in Table 2.

COMPARATIVE EXAMPLES 4-6

For comparison, polymers and optical disk plates were prepared and their properties were determined in the same manner as in Examples 7-10 except for using as the monomer(s) TCD alone, DCP alone, or TCD and NB. The results are shown in Table 2.

As is apparent from Table 2, the ring-opening hydrogenated copolymer of the present invention has a Tg in a favorable range of 100°-135° C., shows a good birefringence value even in the region of relatively high Tg and is excellent in optical properties. Further, it has high water resistance and chemical resistance and thus is a polymer with well-balanced properties.

TABLE 2

| | Example | | | | Comparative Example | | |
|---|---|---|---|---|---|---|---|
| | 7 | 8 | 9 | 10 | 4 | 5 | 6 |
| TCD (wt %) | 75 | 25 | 65 | 80 | 100 | 85 | 0 |
| NB (wt %) | 10 | 10 | 25 | 10 | 0 | 15 | 0 |
| DCP (wt %) | 15 | 65 | 10 | 10 | 0 | 0 | 100 |
| Yield (wt %) | 78 | 69 | 62 | 80 | 60 | 65 | 68 |
| Intrinsic viscosity [η] (dl/g) | 0.60 | 0.59 | 0.60 | 0.61 | | | |
| TCD repeating unit content in polymer (mol %) | 68 | 21 | 55 | 73 | 100 | 77 | 0 |
| NB repeating unit content in polymer (mol %) | 15 | 14 | 35 | 16 | 0 | 23 | 0 |
| DCP repeating unit content in polymer (mol %) | 17 | 65 | 10 | 11 | 0 | 0 | 100 |
| Hydrogenation rate (%) | 100 | 100 | 100 | 100 | 100 | 100 | 100 |
| Glass transition temperature Tg (°C.) | 132 | 101 | 109 | 135 | 163 | 125 | 93 |
| Intrinsic viscosity [η] (dl/g) | 0.61 | 0.57 | 0.60 | 0.59 | 0.59 | 0.63 | 0.68 |
| Light transmittance (%) (1.2 mm thick disk, determined at 830 mm) | 90 | 92 | 91 | 90 | 89 | 91 | 91 |
| birefringence (nm) (double pass, determined at 633 nm) | 15~50 | 5~40 | 10~40 | 15~50 | 40~130 | 30~80 | 30~90 |
| Moisture absorption (wt %) (JIS 6911) | 0.1> | 0.1> | 0.1> | 0.1> | 0.1> | 0.1> | 0.1> |
| Solvent resistance (20 hours, room temp.) | | | | | | | |
| Ethyl acetate | ○ | ○ | ○ | ○ | ○ | ○ | ○ |
| Acetone | ○ | ○ | ○ | ○ | ○ | ○ | ○ |
| Chemical resistance (20 hours, room temp.) | | | | | | | |
| 28% aq. ammonia | ○ | ○ | ○ | ○ | ○ | ○ | ○ |
| 97.6% sulfuric acid | ○ | ○ | ○ | ○ | ○ | ○ | ○ |

Note:
The symbol ○ in the table indicates that no change occurred in appearance.

INDUSTRIAL APPLICABILITY

The novel ring-opening hydrogenated copolymer of the present invention is excellent in thermal resistance and optical properties and has well-balanced properties including transparency, water resistance, chemical resistance and solvent resistance. Accordingly it can be used in a vast variety of fields including the optical field.

We claim:

1. A polycyclic norbornene or its derivative ring-opening hydrogenated copolymer which contains 90-10% by mole of a repeating unit represented by the following formula [I] or the alkyl-substituted derivative thereof and at least a repeating unit represented by the following formula [II] or the alkyl-substituted derivative thereof, has an intrinsic viscosity [η] of 0.01-20 dl/g as determined in toluene at 25° C. and in which at least 50% of the (C—C) linkages constituting the main chain are single bonds

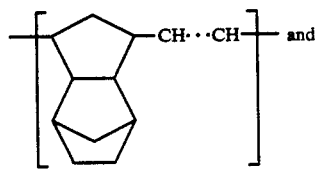

[I]

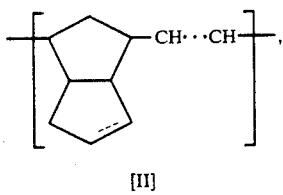

[II]

wherein   represents either a single bond or a double bond.

2. A polycyclic norbornene or its derivative ring-opening hydrogenated copolymer according to claim 1 which contains 10–90% by mole of a repeating unit represented by the above formula [II] or the alkyl-substituted derivative thereof.

3. A polycyclic norbornene or its derivative ring-opening hydrogenated copolymer according to claim 1 which contains 5–80% by mole of a repeating unit represented by the above formula [II] or the alkyl-substituted derivative thereof and 5–50% by mole of a repeating unit represented by the following formula [III], the alkyl-substituted derivative thereof or the alkylidene-substituted derivative thereof

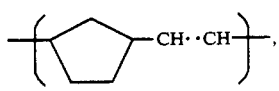

[III]

wherein   represents either a single bond or a double bond.

4. A process for producing a polycyclic norbornene or its derivative ring-opening hydrogenated copolymer wherein at least 50% of the (C   C) linkages constituting the main chain are single bonds which comprises hydrogenating with hydrogen and by use of a hydrogenation catalyst a part or the whole of the olefinic unsaturated groups contained in a polycyclic norbornene or its derivative ring-opening copolymer which contains 90–10% by mole of a repeating unit represented by the following formula [I'] or the alkyl-substituted derivative thereof and at least a repeating unit represented by the following formula [II'] or the alkyl-substituted derivative thereof, and has an intrinsic viscosity [η] of 0.01–20 dl/g as determined in toluene at 25° C.

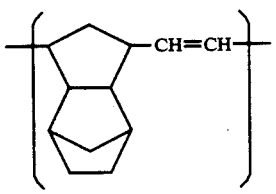

[I']

and

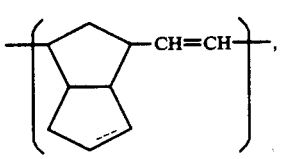

[II']

wherein   represents either a single bond or a double bond.

5. A process for producing a polycyclic norbornene or its derivative ring-opening hydrogenated copolymer according to claim 4 wherein said ring-opening copolymer contains 10–90% by mole of a repeating unit represented by the above formula [II'] or the alkyl-substituted derivative thereof.

6. A process for producing a polycyclic norbornene or its derivative ring-opening hydrogenated copolymer according to claim 4 wherein said ring-opening copolymer contains 5–80% by mole of a repeating unit represented by the above formula [II'] or the alkyl-substituted derivative thereof and 5–50% by mole of a repeating unit represented by the following formula [III'], the alkyl-substituted derivative thereof or the alkylidene-substituted derivative thereof

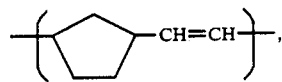

[III']

wherein   represents either a single bond or a double bond.

7. A polycyclic norbornene or its derivative ring-opening hydrogenated copolymer according to claim 1 which contains 80–20% by mole of a repeating unit represented by the formula [I] or the alkyl-substituted derivative thereof and at least 20–80% by mole of a repeating unit represented by the formula [II] or the alkyl-substituted derivative thereof.

8. A polycyclic norbornene or its derivative ring-opening hydrogenated copolymer according to claim 1 which contains 70–30% by mole of a repeating unit represented by the formula [I] or the alkyl-substituted derivative thereof and at least 30–70% by mole of a repeating unit represented by the formula [II] or the alkyl-substituted derivative thereof.

9. A polycyclic norbornene or its derivative ring-opening hydrogenated copolymer according to claim 3 which contains 80–20% by mole of a repeating unit represented by the formula [I] or the alkyl-substituted derivative thereof, 10–70% by mole of a repeating unit represented by the formula [II] or the alkyl-substituted derivative thereof, 10–40% by mole of a repeating unit represented by the formula [III], the alkyl-substituted derivative thereof or the alkylidene-substituted derivative thereof.

10. A process for producing a polycyclic norbornene or its derivative ring-opening hydrogenated copolymer according to claim 4 wherein said ring-opening copolymer contains 80–20% by mole of a repeating unit represented by the formula [I'] or the alkyl-substituted derivative thereof and 20–80% by mole of a repeating unit represented by the formula [II'] or the alkyl-substituted derivative thereof.

11. A process for producing a polycyclic norbornene or its derivative ring-opening hydrogenated copolymer according to claim 4 wherein said ring-opening copolymer contains 70–30% by mole of a repeating unit represented by the formula [I'] or the alkyl-substituted derivative thereof and 30–70% by mole of a repeating unit represented by the formula [II'] or the alkyl-substituted derivative thereof.

12. A process for producing a polycyclic norbornene or its derivative ring-opening hydrogenated copolymer according to claim 4 wherein said ring-opening copolymer is prepared by mixing a) tetracyclododecene or its alkyl derivative and b) dicyclopentadiene or its alkyl derivative.

13. A process for producing a polycyclic norbornene or its derivative ring-opening hydrogenated copolymer according to claim 4 wherein said ring-opening copolymer is prepared by heat-treating a) tetracyclododecene or its alkyl derivative and b) dicyclopentadiene or its alkyl derivative.

14. A process for producing a polycyclic norbornene or its derivative ring-opening hydrogenated copolymer according to claim 13 wherein said ring-opening copolymer is prepared by heat-treating in the presence of cyclopentene.

15. A process for producing a polycyclic norbornene or its derivative ring-opening hydrogenated copolymer according to claim 13 wherein said heat-treating is conducted in an inert atmosphere at a temperature of 120°–250° C. for 0.5 to 20 hours.

16. A process for producing a polycyclic norbornene or its derivative ring-opening hydrogenated copolymer according to claim 13 wherein said heat-treating is conducted in an inert atmosphere at a temperature of 150°–230° C. for 1 to 10 hours.

17. A process for producing a polycyclic norbornene or its derivative ring-opening hydrogenated copolymer according to claim 4 wherein the olefinic unsaturated groups contained in the polycyclic norbornene or its derivative ring-opening copolymer are at least 50 % hydrogenated.

18. A process for producing a polycyclic norbornene or its derivative ring-opening hydrogenated copolymer according to claim 4 wherein the olefinic unsaturated groups contained in the polycyclic norbornene or its derivative ring-opening copolymer are at least 80 % hydrogenated.

19. A process for producing a polycyclic norbornene or its derivative ring-opening hydrogenated copolymer according to claim 4 wherein the olefinic unsaturated groups contained in the polycyclic norbornene or its derivative ring-opening copolymer are at least 90 % hydrogenated.

20. A process for producing a polycyclic norbornene or its derivative ring-opening hydrogenated copolymer according to claim 6 wherein said ring-opening copolymer contains 80–20% by mole of a repeating unit represented by the formula [I'] or the alkyl-substituted derivative thereof, 10–70% by mole of a repeating unit represented by the formula [II'] or the alkyl-substituted derivative thereof, 10–40% by mole of a repeating unit represented by the formula [III'], the alkyl-substituted derivative thereof or the alkylidene-substituted derivative thereof.

21. A process for producing a polycyclic norbornene or its derivative ring-opening hydrogenated copolymer according to claim 6 wherein said ring-opening copolymer is prepared by mixing a) tetracyclododecene or its alkyl derivative and b) dicyclopentadiene or its alkyl derivative, and c) unsubstituted or substituted norbornene.

22. A process for producing a polycyclic norbornene or its derivative ring-opening hydrogenated copolymer according to claim 6 wherein said ring-opening copolymer is prepared by heat-treating a) tetracyclododecene or its alkyl derivative and b) dicyclopentadiene or its alkyl derivative, and c) unsubstituted or substituted norbornene.

23. A process for producing a polycyclic norbornene or its derivative ring-opening hydrogenated copolymer according to claim 22 wherein said ring-opening copolymer is prepared by heat-treating in the presence of cyclopentene.

24. A process for producing a polycyclic norbornene or its derivative ring-opening hydrogenated copolymer according to claim 22 wherein said heat-treating is conducted in an inert atmosphere at a temperature of 120°–250° C. for 0.5 to 20 hours.

25. A process for producing a polycyclic norbornene or its derivative ring-opening hydrogenated copolymer according to claim 22 wherein said heat-treating is conducted in an inert atmosphere at a temperature of 150°–230° C. for 1 to 10 hours.

26. A process for producing a polycyclic norbornene or its derivative ring-opening hydrogenated copolymer according to claim 6 wherein the olefinic unsaturated groups contained in the polycyclic norbornene or its derivative ring-opening hydrogenated copolymer are at least 50 % hydrogenated.

27. A process for producing a polycyclic norbornene or its derivative ring-opening hydrogenated copolymer according to claim 6 wherein the olefinic unsaturated groups contained in the polycyclic norbornene or its derivative ring-opening hydrogenated copolymer are at least 80 % hydrogenated.

28. A process for producing a polycyclic norbornene or its derivative ring-opening hydrogenated copolymer according to claim 6 wherein the olefinic unsaturated groups contained in the polycyclic norbornene or its derivative ring-opening hydrogenated copolymer are at least 90 % hydrogenated.

29. The process of claim 4, wherein said polycyclic norbornene or its derivative ring-opening copolymer is polymerized by use of Ti-based catalyst.

30. The process of claim 5, wherein said polycyclic norbornene or its derivative ring-opening copolymer is polymerized by use of Ti-based catalyst.

31. The process of claim 8, wherein said polycyclic norbornene or its derivative ring-opening copolymer is polymerized by use of Ti-based catalyst.

32. The polycyclic norbornene of claim 1, wherein at least 80% of the double bonds in the polymer are hydrogenated and the intrinsic viscosity of the polymer is 0.1–10 dl/g as determined in toluene at 25° C.

33. The polycyclic norbornene of claim 32, wherein at least 90% of the double bonds in the polymer are hydrogenated.

34. The polycyclic norbornene of claim 1, wherein at said polymer has a Tg of about 100° C. to about 150° C.

35. The polycyclic norbornene of claim 3, wherein at said polymer has a Tg of about 100° C. to about 135° C.

* * * * *